United States Patent

[11] 3,572,937

[72] Inventor Richard R. Baldwin
 Clinton, Tenn.
[21] Appl. No. 773,113
[22] Filed Nov. 4, 1968
[45] Patented Mar. 30, 1971
[73] Assignee The United States of America as represented by the United States Atomic Energy Commission

[54] METHOD AND APPARATUS FOR INTERFEROMETRIC MEASUREMENT OF MACHINE SLIDE ROLL
 7 Claims, 11 Drawing Figs.

[52] U.S. Cl. .................................................. 356/110, 356/170
[51] Int. Cl. .................................................... G01b 9/02
[50] Field of Search .......................................... 356/110, 169, 170, 151, 150, 19; 250/237; 350/237 (G), 3.5

[56] References Cited

UNITED STATES PATENTS
583,243 5/1897 Barr et al. ..................... 356/19
3,419,898 12/1968 Baldwin et al. ............... 356/110

OTHER REFERENCES
Guild, J. Diffraction Gratings As Measuring Scales. Oxford University Press. 1960. p. 3 relied upon.

Brandt, G.B. " Hologram-Moire Interferometry For Transparent Objects," Applied Optics, Vol. 6, No. 9, Sept. 1967. p. 1535—1540.

Collier, R.J. et al., " Application of Moire Techniques To Holography," Applied Physics Letters. Vol. 7, No. 8, Oct. 15, 1965. p. 223—225.

George, N. et al., " Holographic Diffraction Gratings," Applied Physics Letters, Vol. 9, No. 5, Sept. 1, 1966. p. 212—215.

*Primary Examiner*—Ronald L. Wibert
*Assistant Examiner*—T. Major
*Attorney*—Roland A. Anderson ABSTRACT: A method and apparatus for interferometric measurement of machine slide roll has been provided wherein split beams from a laser mounted on a machine bed are intersected to generate a fringe pattern extending along and normal to an axis which is parallel to the axis of a machine slide. A light-transmitting hologram previously provided with a similar fringe pattern is mounted to the slide and is oriented relative to the generated pattern so as to transmit light characterized by a "no-roll" Moire fringe pattern. Any roll of the machine slide rotates the hologram, producing a proportional change in the "no-roll" Moire fringe spacing.

Patented March 30, 1971

INVENTOR.
Richard R. Baldwin
BY

ATTORNEY.

Patented March 30, 1971 3,572,937

INVENTOR.
Richard R. Baldwin
BY

ATTORNEY.

# METHOD AND APPARATUS FOR INTERFEROMETRIC MEASUREMENT OF MACHINE SLIDE ROLL

BACKGROUND OF THE INVENTION

This invention was made during the course of, or under, a contract with the United States Atomic Energy Commission.

The present invention relates to devices for detecting roll of an object relative to another object and more specifically to a method and apparatus for interferometric measurement of minute roll deviations in machine tools.

As a result of closer tolerances in machined parts, there is constantly a growing need for more accurate means of measuring machine tool movements. Many errors in machining parts are brought about by roll of the machining tool as it moves along a slide due to imperfections of slide alignment. For very close tolerances these errors become significant. To eliminate these errors, it is necessary either to eliminate the cause or the effect; that is, the slide must be perfectly straight and level or the slide errors at any position must be known and compensated for. In either case, the errors must first be determined.

In the past, various methods of measuring straightness have been developed including comparison with a mobile fluid, such as a water mirror, by means of a level or a precision straight edge, by comparing directly with a straight edge, by using the straightness of light rays from an alignment telescope and various interferometric means.

In correcting roll errors of a machine slide it has been the practice primarily to use a precision level. The level is positioned transversely on the slide and changes in level reading are recorded as the level is moved incrementally along the slide. Subsequently, the slide rails are scraped as required to eliminate the observed amounts of roll.

The use of a precision level permits direct measurement of the total amount of roll relative to the force of gravity. Unfortunately, the roll angle thus measured is the sum of two roll angles; that is, the roll of the entire machine resulting from flexure of the machine base, and the roll of the slide relative to the base. Since it is desired to correct only the roll of the slide relative to the base, two precision levels are used. One of these is mounted on the slide and the other on the base. In practice this technique imposes problems because of the limited accuracy and linearity of precision levels. It is difficult to determine the difference in the readings of the levels, especially when the roll of the base is large compared to the slide roll relative to the base. Another objection to the use of levels is that they can be used only with horizontal slides.

SUMMARY OF THE INVENTION

The present invention provides a method and apparatus therefor which overcomes the above-described limitations in detecting roll and has as its primary object the provision of a method and apparatus therefor for interferometric measurement of minute increments of roll movement of an object.

Another object of the present invention is to provide a method for measuring roll of an object which provides a very high degree of accuracy and is relatively inexpensive especially when measuring the roll of precision machine slides.

It is another object of this invention to provide an interferometer for measuring machine slide roll in which an interfering beam pattern is compared with a standard pattern placed in the interfering pattern and held by the object being measured to provide a Moire fringe which directly indicates minute increments of roll.

Still another object of the present invention is to provide an interferometer of increased sensitivity for measuring roll of an object moving in a direction parallel to the interfering light beams.

The objects of the present invention are realized by providing first and second light beams directed to intersect so as to generate a fringe pattern extending along and normal to an axis parallel to the axis of the object whose roll is to be measured. A light-transmitting member, having a prerecorded fringe pattern similar to the generated fringe pattern, is attached to the object being measured so that the prerecorded pattern is oriented in the path of the generated fringe pattern to generate a Moire fringe pattern. When the light-transmitting member is aligned with the generated fringe pattern a reference Moire fringe pattern is generated and thus small increments of roll of the recorded pattern are observed as a change in the Moire fringe pattern which can be measured directly or by automatic detecting devices to provide an indication of the amount of roll.

Other objects and many of the attendant advantages of the present invention will be readily evident from the following description when taken in conjunction with the accompanying drawings.

DETAILED DESCRIPTION

Figure 1:
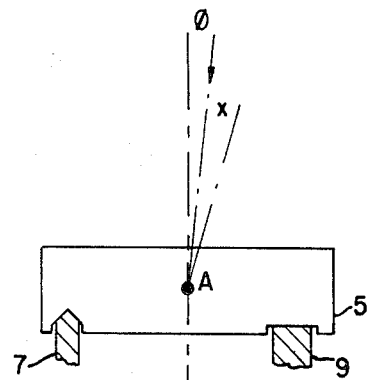
FIG. 1 is a schematic diagram illustrating machine slide roll.

The novel method and apparatus of this invention will be illustrated as applied to the measurement of "roll" in machine tools, such as contouring machines. The term roll is defined by reference to FIG. 1 which shows a horizontally disposed machine slide 5 mounted on rails 7 and 9 of a machine base (not shown). Roll, as referred to in the specification, is the angle generated by rotation of the machine slide 5 about its longitudinal axis A. When measuring this angle with a precision level, as discussed above, the total amount of roll relative to the force of gravity (G) is measured. Unfortunately, the roll angle thus measured is the sum of two roll angles, , and $x$; these represent, respectively, the roll of the entire machine resulting from flexure of the machine base, for example, and the roll of the slide relative to the base. Since it is desired to measure and correct only the roll of the slide relative to the machine, the inventor has provided the device shown schematically in FIG. 2 in its most simple form.

Figure 2:
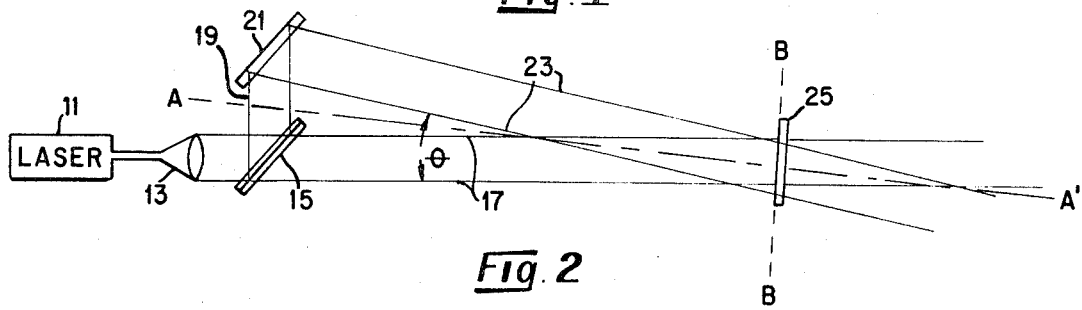
FIG. 2 is a schematic view of one form of apparatus used to generate Moire fringes in accordance with this invention.
Figure 3:
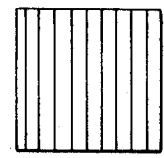
FIG. 3 is a view of a fringe pattern generated by the intersection light beams of FIG. 2.

Referring now to FIG. 2, the device comprises a source of light such as a laser 11 having its output beam directed into a collimator 13. The collimated beam is directed onto a beamsplitter 15 so that a portion of the light continues along lines 17 and a portion is redirected along lines 19 onto a mirror 21. Mirror 21 redirects the incident beam along lines 23 so that the beams intersect at a point along a selected axis A–A'. The axis A–A' is parallel to the longitudinal axis of the machine slide (not shown) whose roll is to be measured. The angle of intersection $\theta$ of the light beams is selected so that the beams overlap along the axis A–A' for a distance corresponding to the length of the machine slide to be inspected for roll. Throughout the region of overlap the beams 17 and 23 generate a system of parallel, straight interference fringes which are normal to the axis A–A'. This system of fringes, illustrated in FIG. 3, is referred to as the "generated" fringe pattern.

The optical assembly including laser 11, collimator 13, beamsplitter 15 and reflector 21 are mounted on the machine base. A light-transmitting member, for example, a hologram 25 which has been provided with a "recorded" fringe pattern identical to the "generated" pattern, is mounted to the machine slide (not shown) so as to move with the slide and to roll with the slide. The hologram is mounted within the region of overlap of beams 17 and 23, positioned normal to the axis A-A' and oriented with its recorded fringe pattern essentially parallel to the generated pattern. As indicated above, the region of beam overlap is made sufficiently long for the hologram to remain therein throughout an excursion of the machine slide.

The use of a hologram as the recorded fringe pattern is highly desirable because it can be prepared easily in a dark room by exposing the holographic film to overlapping beams of light produced by an arrangement identical to that shown in FIG. 2 and involves very little expense. If desired, however, a suitably ruled standard transmission grating could be substituted for the hologram in areas where, for example, the residual error due to shrinkage of the hologram emulsion would be objectionable. The inventor has also found that a standard Kosters prism can be substituted for the hologram.

Figure 4:
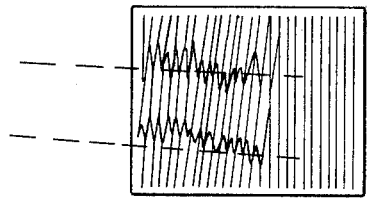
FIGS. 4, 5A, 5B, and 5C are views of various Moire fringe patterns obtained with the arrangement of FIG. 2.

If the above-mentioned generated and recorded fringe patterns are aligned so that they are exactly parallel, equally spaced, and superposed, no interference pattern will be noted in the light transmitted through the hologram or other devices mentioned which may be used. If the patterns are not superposed but disposed alternately, no light will be transmitted. If the generated and recorded fringes are inclined relative to each other to a slight extent, a Moire fringe pattern of the kind illustrated in FIG. 4 will be observed in the transmitted light. This Moire pattern is sensitive to rotation (roll) of the hologram since such rotation changes the vertical spacing of the Moire fringes. Although this characteristic of the pattern indicates slight roll movements of the hologram or similar device, it is not very useful in accurate measurement of roll because of the difficulty in determining the extent to which the fringes have shifted from their aligned or "no-roll" position. The use of this Moire pattern to measure roll also is made difficult because any lateral movement of the machine slide causes the entire pattern to shift vertically.

Figure 5A:
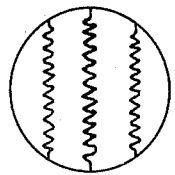
Figure 5B:
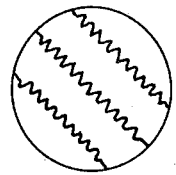
Figure 5C:
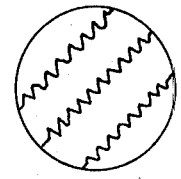

The angle $\theta$ (FIG. 2) can, however, be varied slightly to alter the Moire pattern to the form shown in FIG. 5A. As indicated in FIGS. 5B and 5C, rotation of the hologram causes this pattern to incline clockwise or counterclockwise, depending on the direction of roll. The amount of inclination is proportional to the amount of roll for very small angles of interest. Thus, proper initial adjustment of the angle $\theta$ provides an easily detected readout which is proportional to roll of the machine slide only and not the entire machine. This readout is comparatively insensitive to lateral movement. To determine the amount of roll for a given slide position, the operator observes the inclination of the Moire pattern when the slide is in that position. He then uses a clinometer or the like to reset the hologram to the position where the "no-roll" (FIG. 5A) is observed. The clinometer adjustment required corresponds to the amount of roll at this position of the slide.

In the procedure just described the accuracy of the roll measurement depends on the accuracy to which the operator can restore the fringe pattern to the original "no-roll" pattern. In tests conducted with split beams having diameters of about 0.5 inch and intersecting at an angle $\theta$ of about 9°, a manual setting accuracy of $\pm$ 5 seconds of arc was obtained. It was found that the accuracy is increased by increasing the beam diameters. With the beam diameters increased to 4 inches a setting accuracy of about $\pm$ 0.6 second of arc can be obtained over a slide travel of about 50 inches.

Figure 6A:
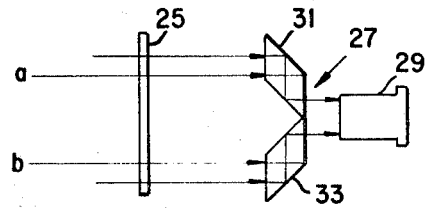
FIG. 6 illustrates an auxiliary assembly for use with the arrangement of FIG. 2.
Figure 6B:
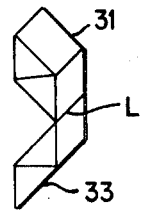

The setting accuracy can be increased still further if an optical assembly 27, shown in FIG. 6A, is interposed between the transmitting face of the hologram 25 and a standard eyepiece 29. Assembly 27 consists of two like glass bodies 31 and 33 which are respectively positioned to intercept the top and bottom portion of the "no-roll" fringe pattern in FIG. 5A. The bodies 31 and 33, each of which may consist of two standard porro prisms mounted base to base, as shown in FIG. 6B, direct their respective beams to a common line L.

Figure 7A:
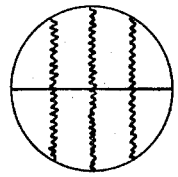
FIGS. 7A and 7B are views of Moire fringe patterns obtained when the assembly of FIG. 6 is incorporated in the arrangement of FIG. 2.
Figure 7B:
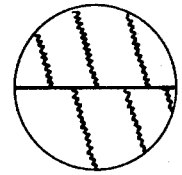

With this arrangement, the "no-roll" pattern of FIG. 5- is converted to a pattern consisting of parallel, straight fringes, shown at 7A. Roll of the hologram splits and inclines these fringes, generating a split fringe pattern of the kind shown in FIG. 7B. The displacement between split fringes, for example, between fringe portions F and F' is proportional to the amount of roll. A higher degree of accuracy is obtained with this kind of fringe pattern because it is easier to determine when the hologram has been rotated to the reset position sufficiently to restore the pattern to its original "no-roll" condition. That is, the "no-roll" position can be established with definiteness because it is the position where the split fringes come into alignment.

Using the split fringe technique just described, manual setting accuracies of $\pm$ 1 second of an arc are obtainable over a 50-inch slide movement using beam diameters of only 1 inch. This accuracy is increased to about $\pm$ 0.5 second over a 128-inch slide movement by using the optimum beam size which is a beam of square cross section measuring about 4 inches on a side.

The above-described method and apparatus are readily amenable to automation as in a tape controlled machine. For example, standard photocell circuits can be mounted respectively to the top and bottom portions of the rear faces of the prism assemblies 31 and 33 of FIG. 6A. The outputs of the circuits are combined subtractively to obtain an output signal proportional to the displacement between fringe portions. With this arrangement, it is not necessary to reset the hologram to determine the amount of roll. The output signals fed directly into a system for automatically correcting the position of the cutting tool carried by the slide compensate for minute roll deviations. In an alternative mode of operation, automatic means may be provided to reset the hologram to reduce the output signal to zero, means being provided to record the resetting angle.

Thus, it will be seen that a method and apparatus therefor have been provided for interferometric measurement of roll of a machine slide or the like which is extremely accurate, inexpensive to manufacture, and insensitive to lateral movements. Obviously many modifications may be made by one skilled in the art within the spirit and scope of the invention. For example, in the illustrated form of the invention, the hologram 25 is mounted to move with the object whose roll is to be measured. If desired, however, the hologram can be mounted to a stationary support while the optical assembly is mounted to move with the object whose roll is to be measured, as in a drill press or similar devices.

In view of the above and numerous other equally possible arrangements, the scope of the present invention should be considered limited only by the following claims.

I claim:

1. A method of measuring the roll of an object moving relative to another object, comprising the steps of:
   providing first and second mutually coherent light beams directed to intersect so as to generate a fringe pattern extending along and normal to an axis parallel to the axis of movement of one of said objects;
   providing a light-transmitting member having a prerecorded fringe pattern thereon similar to said generated fringe pattern;
   attaching said light-transmitting member to the other object in a position normal to the axis of said intersecting light beams so as to provide a "no-roll" Moire fringe pattern;
   adjusting the angle of intersection of said first and second light beams so as to cause said Moire fringe pattern to incline in a direction corresponding to the direction of angular displacement of said light transmitting member relative to said intersecting light beams; and
   observing said Moire fringe pattern as said objects are moved relative to each other to detect changes in the inclination of said Moire fringe pattern thereby indicating roll.

2. A device for measuring roll of a slide member relative to a slide way, comprising:
   a coherent light source;
   means for splitting a beam from said light source into two segments and to intersect so as to generate a fringe pattern extending along and normal to an axis parallel to the axis of said slide way; and a light-transmitting member having a prerecorded fringe pattern thereon similar to said generated fringe pattern, said light-transmitting member being mounted on said slide member and oriented in a plane normal to said axis of said generated fringe pattern so as to provide a Moire reference fringe pattern which inclines in the direction of roll of said slide member as said slide member is moved along said slide way.

3. A device as set forth in claim 2 wherein said light source includes a laser and a light beam collimator.

4. A device as set forth in claim 3 wherein said light-transmitting member is a hologram having a transmitting face wherefrom said Moire fringe pattern emerges.

5. A device as set forth in claim 4 wherein said means for splitting and directing the light source beam comprises a beam divider, said beam divider being positioned to intercept the light beam from said collimator so that light incident upon said beam divider is part reflected and part transmitted therethrough, a reflector positioned to intercept said reflected portion of the light beam and reflect the beam so as to intersect said transmitted portion of the light beam at a predetermined angle.

6. A device as set forth in claim 5 further including an optical assembly positioned for viewing said Moire fringe pattern, said assembly comprising an eyepiece, first and second prisms interposed between said eyepiece and the transmitting face of said hologram to intercept the top and bottom portions of said Moire fringe pattern, respectively, so as to generate a split fringe pattern at said eyepiece.

7. A device as set forth in claim 6 wherein each of said first and second prisms includes first and second porro prisms mounted base to base.